Patented Nov. 27, 1951

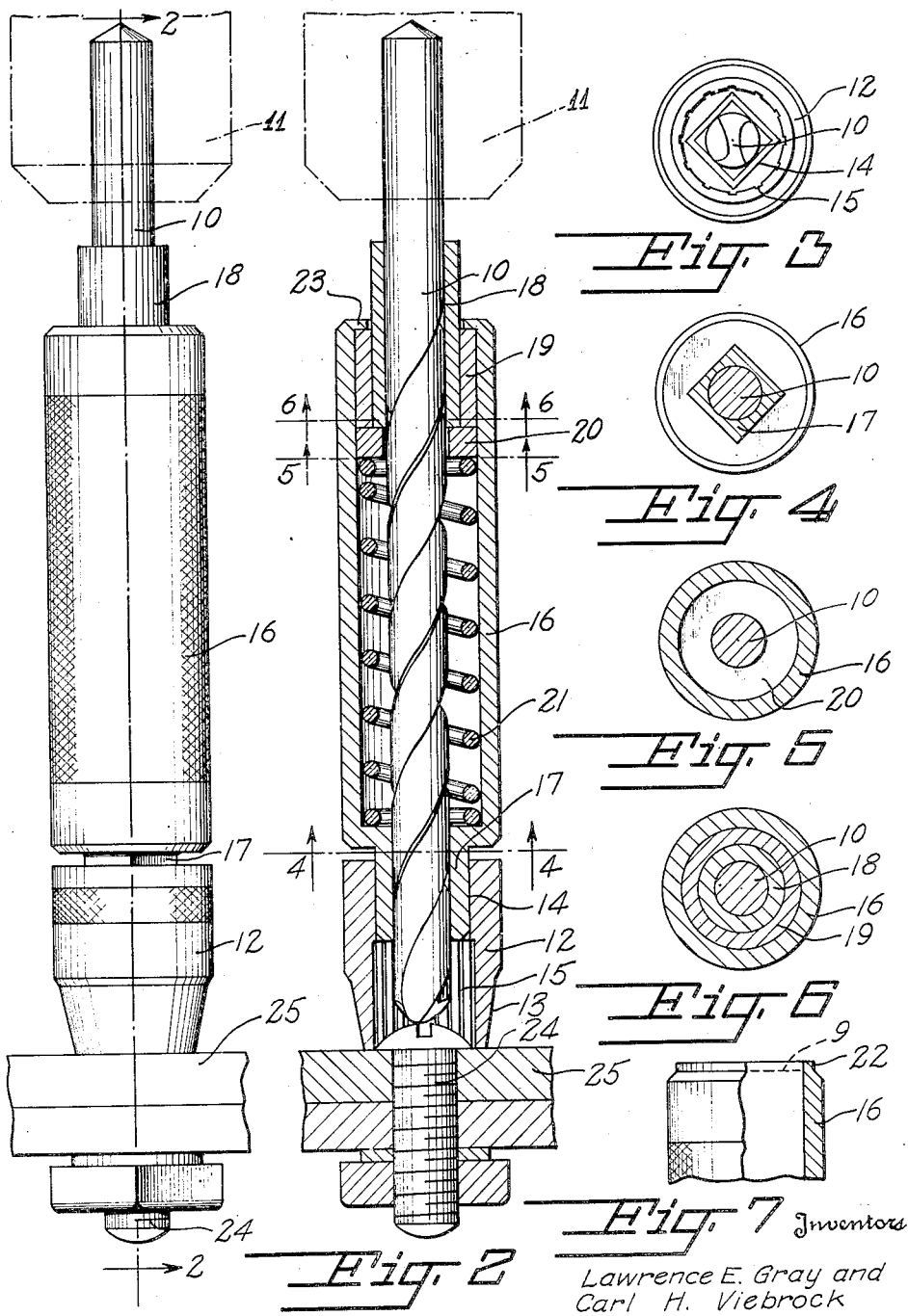

2,576,786

UNITED STATES PATENT OFFICE 2,576,786

CENTRALIZING DRILL

Lawrence E. Gray and Carl H. Viebrock,
Douglas, Wash.

Application September 21, 1948, Serial No. 50,386

1 Claim. (Cl. 77—55)

This invention relates to a drill, and more particularly to an attachment for guiding a drill in the removal of rivets.

The object of the invention is to provide an attachment for a drill that will facilitate the drilling of a rivet or bolt when it is desired to remove the latter.

Another object of the invention is to provide an attachment for a drill that will guide the drill onto a rivet to be removed, and will also facilitate the retraction of the drill after the rivet has been removed.

A further object of the invention is to provide a drill attachment which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a side elevational view of the drill attachment according to the present invention;

Figure 2 is a sectional view taken on the line 2—2 of Figure 1;

Figure 3 is an end elevational view of the device;

Figure 4 is a sectional view taken on line 4—4 of Figure 2;

Figure 5 is a sectional view taken on the line 5—5 of Figure 2;

Figure 6 is a sectional view taken on the line 6—6 of Figure 2;

Figure 7 is a fragmentary elevational view showing the blank for forming the outer casing.

Referring in detail to the drawings, the numeral 10 designates a drill which is driven by a motor 11 (broken lines). The attachment for the drill 10 comprises an open-ended, knurled socket 12 which has its exterior tapered, as at 13. The interior of the socket 12 has a recess 14 of polygonal cross sectional contour extending inwardly from one end thereof and is also provided with a plurality of longitudinally-extending, spaced grooves 15. An open-ended, knurled casing 16 is arranged in end-to-end relation with respect to the socket 12, and the casing 16 is provided on one end with a shoulder 17 having an external cross sectional contour and size to fit snugly in the recess 14 of the socket.

A bronze bearing 18 encircles and is press fitted, or otherwise secured, to the drill 10 and slidably projects through the sleeve 17 at the other open end of the casing 16, and slidably positioned over the bearing 18 and encased within the casing 16 is a steel reduced sleeve extension or bearing 19. A washer 20 abuts the bearing 18 and surrounds the drill 10, and is slidably arranged in the casing 16. A coil spring 21 is circumposed on the drill 10 and is interposed between the washer 20 and shoulder 17 for normally biasing the drill away from the socket 12 when pressure on the drill is released. In assembling the drill attachment, the casing 16 is first fabricated with an upstanding rim 22, Figure 7, to provide sufficient clearance for the insertion of the elements into the interior of the casing. Then, the rim 22 is bent along the crease line 9 to provide the inwardly-extending flange 23, Figure 2, to thereby maintain the device in assembled relation.

The socket 12 is a type commonly used by automobile mechanics. It is to be stated that it is one whereby substitution of different sizes can readily be made to allow for variations of nuts, bolts and rivets.

In use, when it is desired to remove a rivet 24, for example, from a work piece 25, the socket 12 is arranged so that its lower end embraces the head of the rivet. Then, upon application of pressure on the motor 11, the bearing 18 will be moved inwardly in the casing 16 at the same time that the drill 10 is moved through the socket 12 and into engagement with the rivet 24. After the head of the rivet 24 has been drilled away, the rivet 24 can be easily pushed out through the work piece 25 and when the pressure on the drill is released, then the spring 21 will move the washer 20, bearing 18, motor 11 and drill 10 away from the work piece 25.

By means of the attachment, the drill may also be used for removing stove bolts that are rusted, removing carriage bolts from a hood, and can be adapted for many different trades.

As many embodiments may be made of this inventive concept, and as many modifications may be made in the embodiment hereinbefore shown and described, it is to be understood that all matter herein is to be interpreted merely as illustrative and not in a limiting sense.

We claim:

In a tool of the class described, a tubular casing having a lower reduced end portion and an annular flange inturned at its upper end, a drill extending axially through said casing and projecting beyond said reduced end portion, a bearing sleeve encircling said drill and positioned within the upper end of said casing in contact with said flange, a washer within said casing and encircling said drill, a coiled spring within said casing and encircling said drill and having its lower end seated on the shoulder formed by the said reduced end portion and its upper end bearing against said washer, a second bearing sleeve encircling and secured to the drill, said second bearing sleeve being seated in the first bearing sleeve and seated on said washer, and a centering member having an axial passage therethrough of the same cross sectional contour as and tightly receiving said reduced end portion on which it is seated, the outer side of the lower end portion of the centering member inwardly tapered, said member being adapted to be seated over an area to be drilled to locate the cutting end of the drill in the center of said area.

LAWRENCE E. GRAY.
CARL H. VIEBROCK.

REFERENCES CITED

The following references are of record in the file of this patent:

UNITED STATES PATENTS

| Number | Name | Date |
|---|---|---|
| 2,294,303 | Jagow | Aug. 25, 1942 |
| 2,296,087 | Burns | Sept. 15, 1942 |